Jan. 8, 1957  F. HAFEKOST  2,776,482
PINKING SHEARS AND METHOD FOR MAKING SAME
Filed April 29, 1949  6 Sheets-Sheet 1
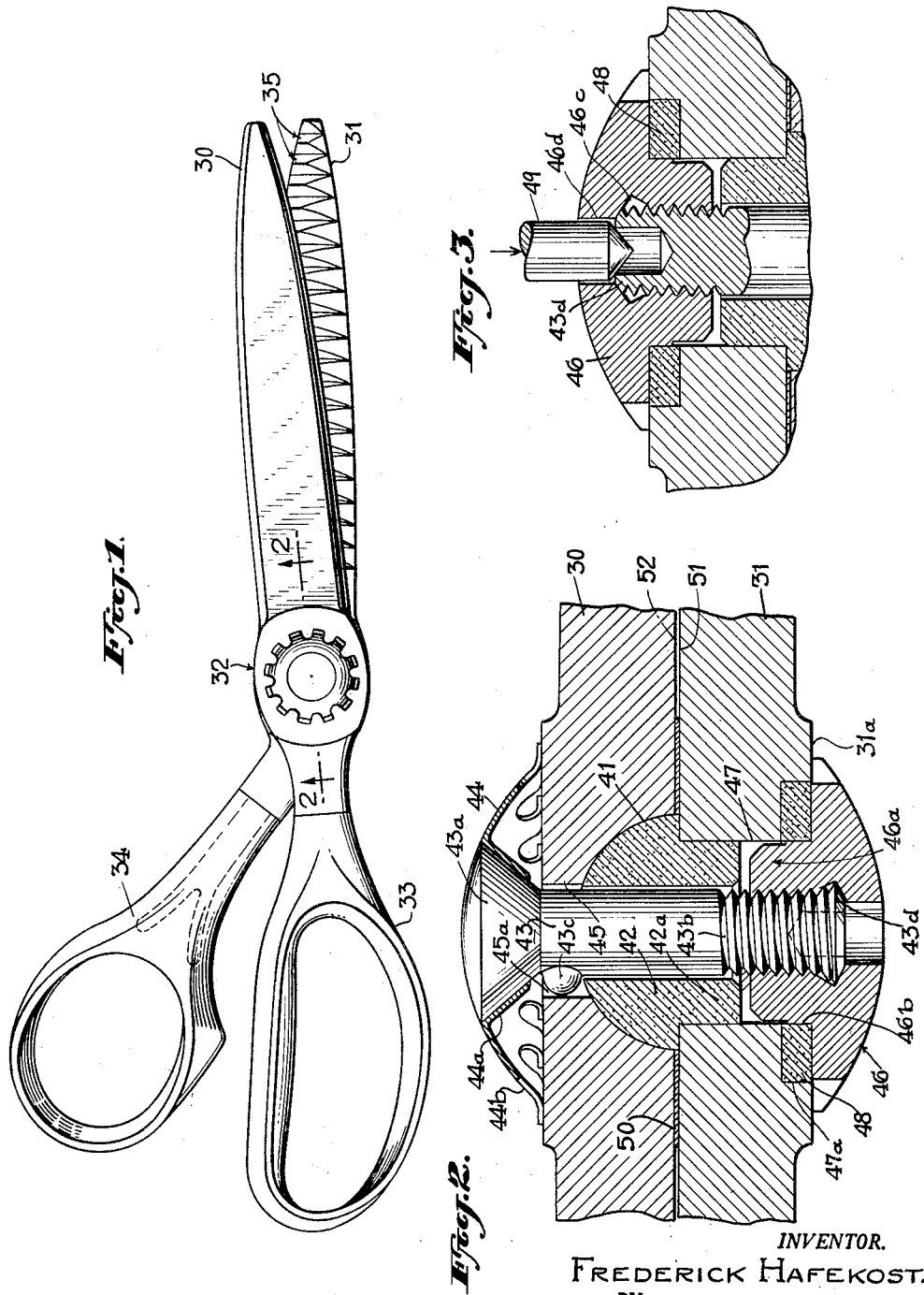
INVENTOR.
FREDERICK HAFEKOST.
BY
Ward, Crosby & Ward
ATTORNEYS.

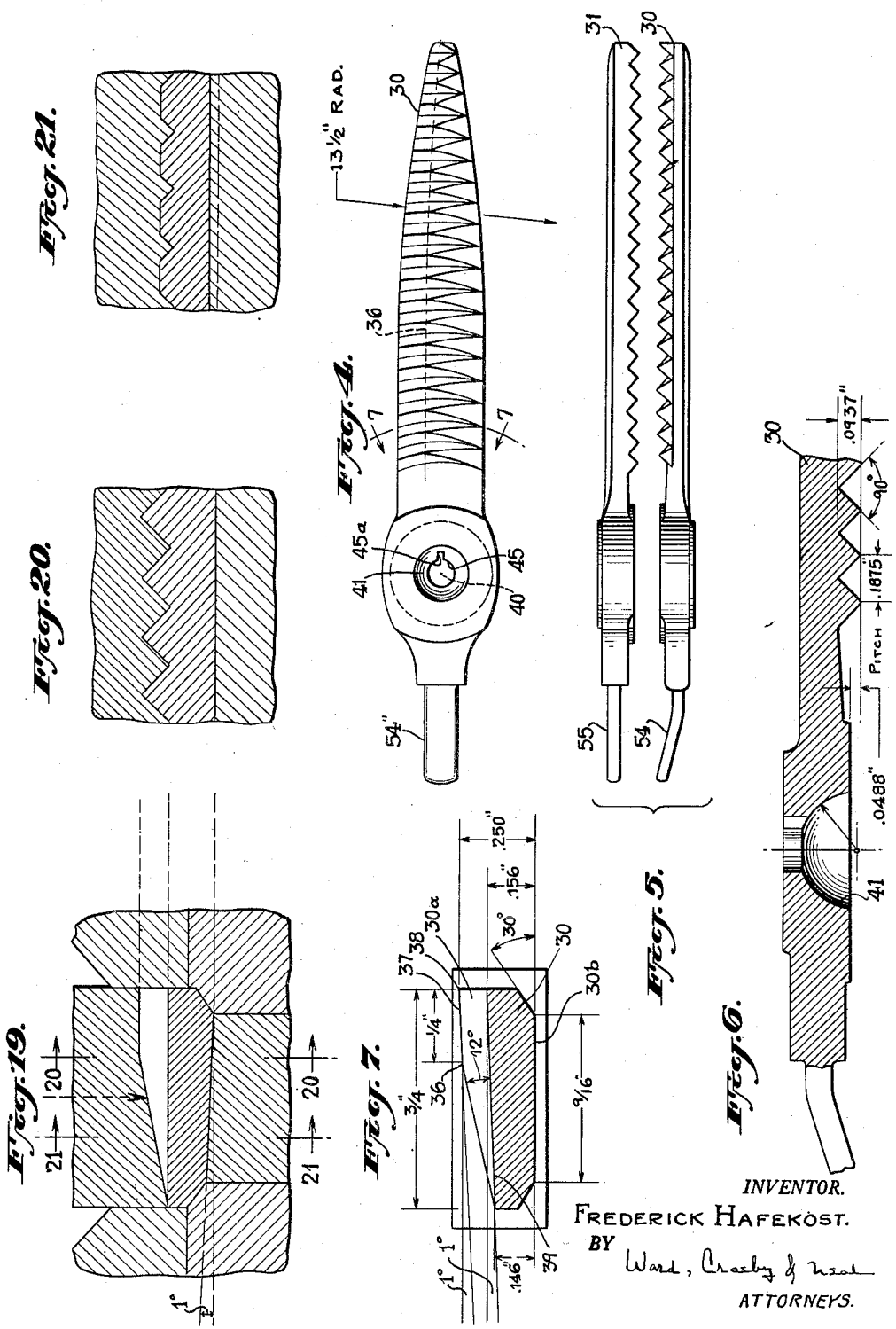

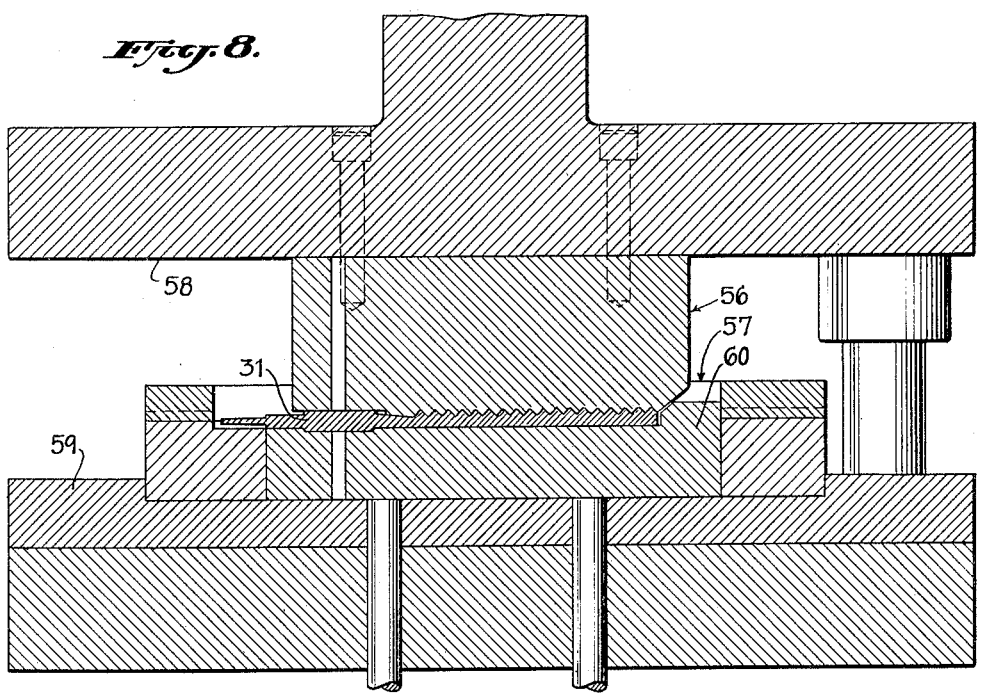
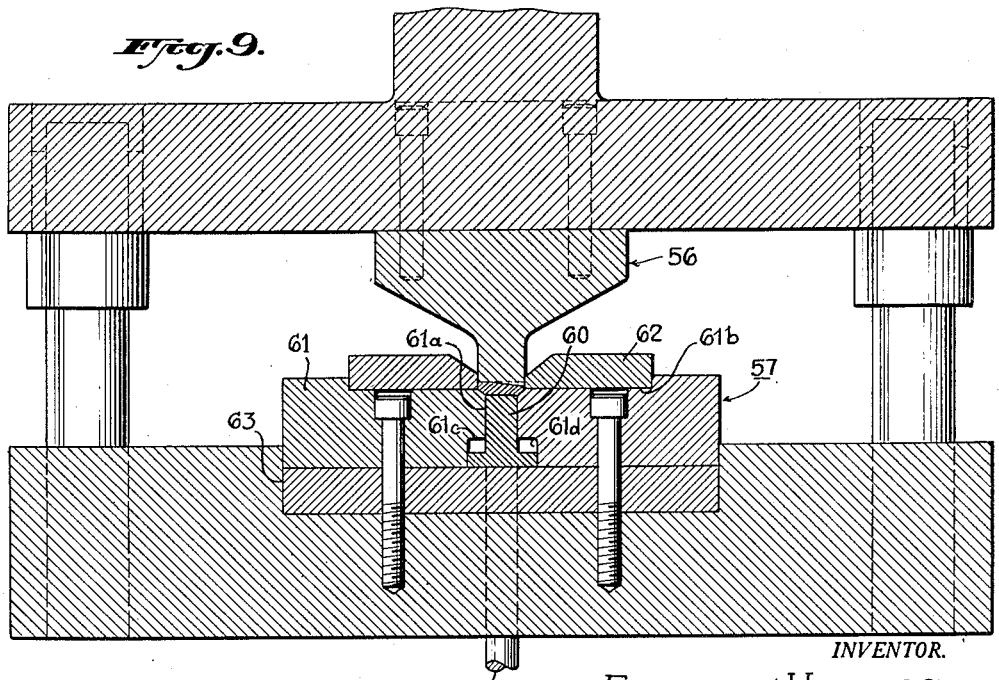

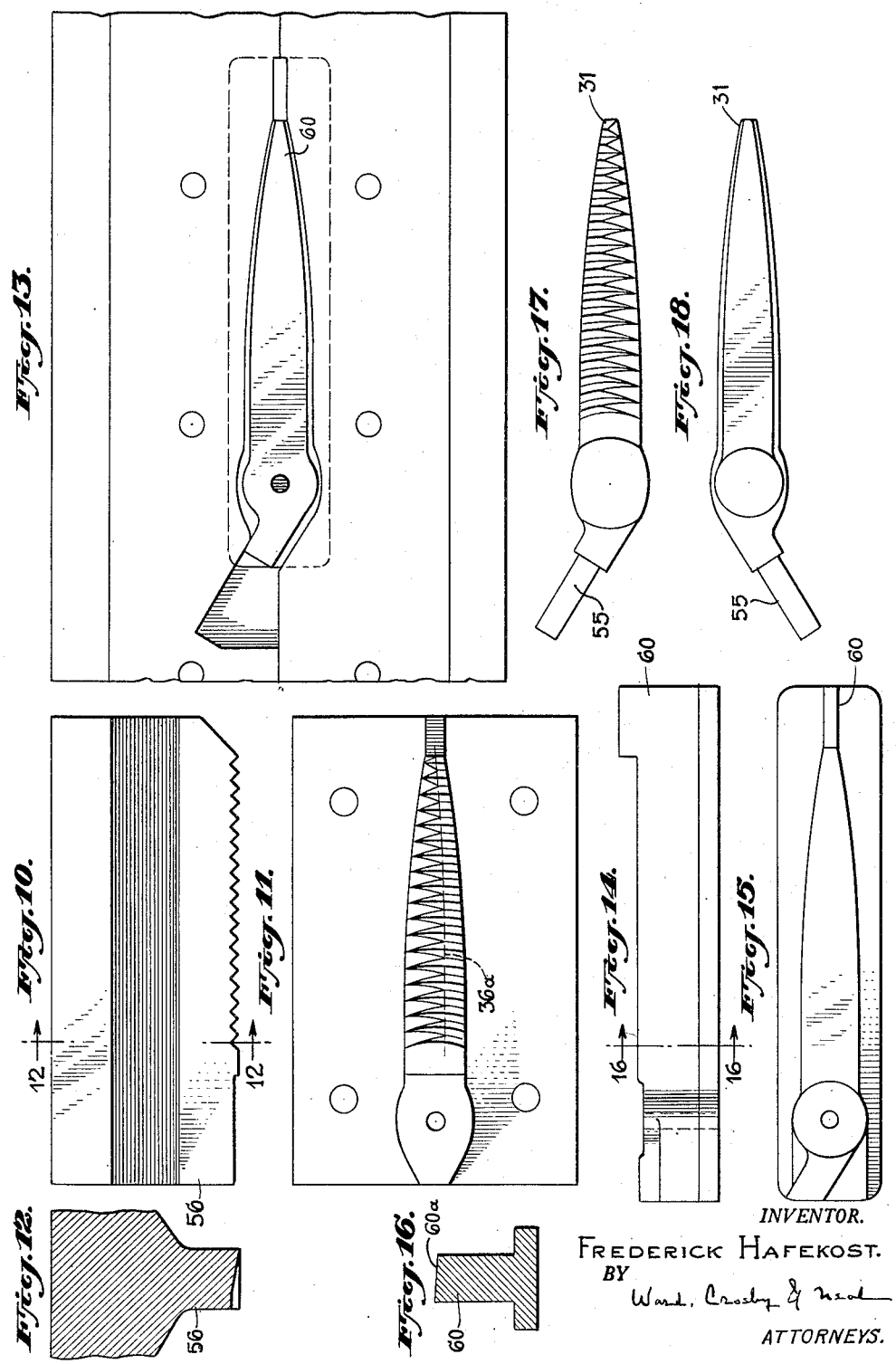

Jan. 8, 1957   F. HAFEKOST   2,776,482
PINKING SHEARS AND METHOD FOR MAKING SAME
Filed April 29, 1949   6 Sheets-Sheet 5
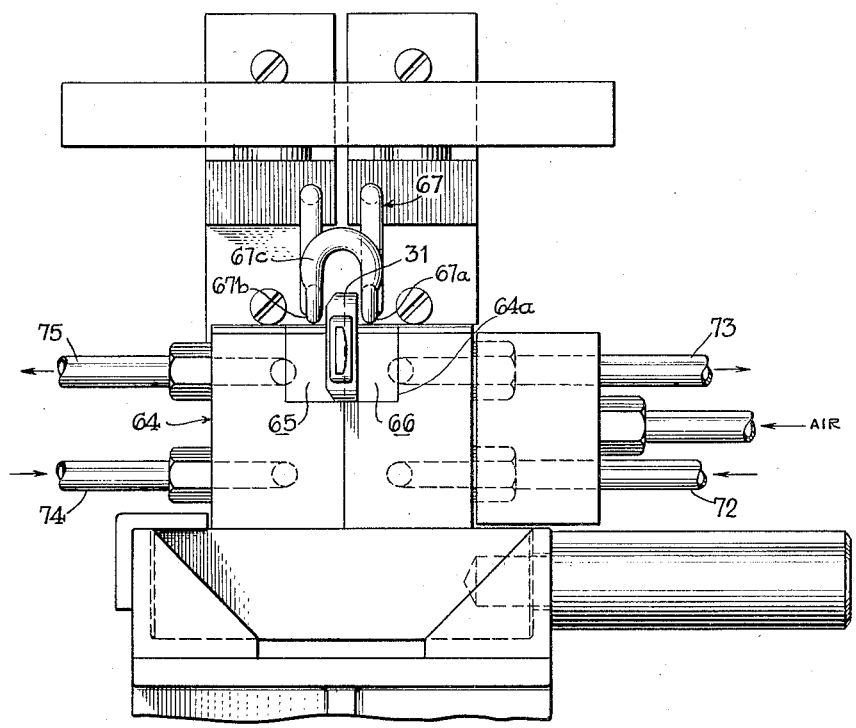
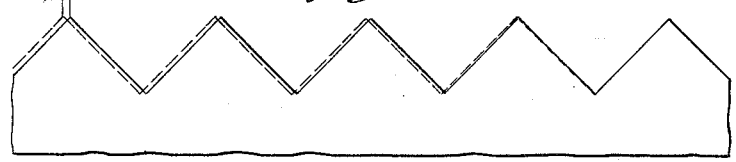
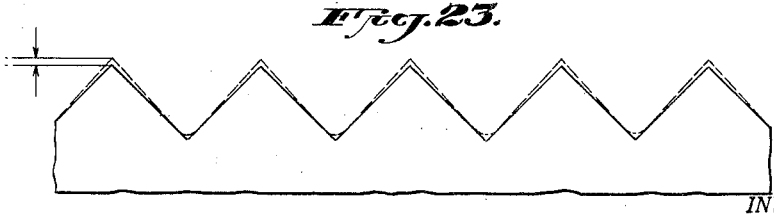
INVENTOR.
FREDERICK HAFEKOST.
BY Ward, Crosby & Ned
ATTORNEYS.

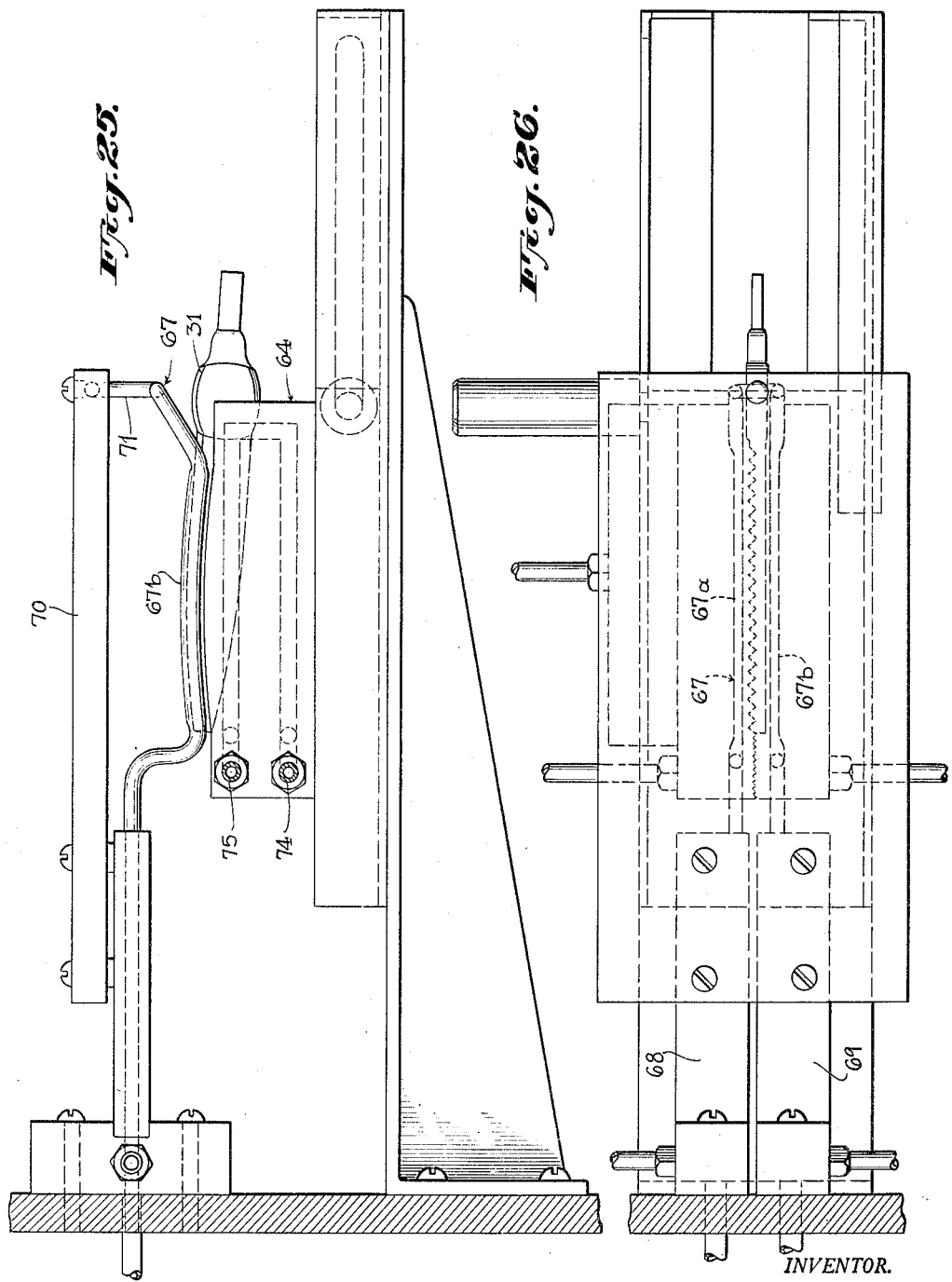

2,776,482

PINKING SHEARS AND METHOD FOR MAKING SAME

Frederick Hafekost, Lake Hopatcong, N. J., assignor, by mesne assignments, to Leo Edelson, Harry S. Schwartz, and Milton R. Cohen, Mamaroneck, Frederick Hafekost, New Rochelle, Abraham Manges, Larchmont, Benjamin Rudikoff, Forest Hills, Morey Stagg, Hempstead, and Daleo Trading Corp., New Rochelle, N. Y., a corporation of New York Application April 29, 1949, Serial No. 90,426

21 Claims. (Cl. 30—230)

This invention relates to shears for cutting sheet material, and more particularly to pinking shears for cutting "zigzag" edges on such sheet material. The invention also relates to methods for making such shears.

In pinking shears and the methods for making same heretofore proposed, one of the chief disadvantages has been the relatively high cost thereof which has been largely attributable to expensive machining operations which have been required for precision shaping or otherwise reducing the blades thereof to accurate dimensions by means of a cuttting tool. Such machine operations have largely been peculiar to each tooth of the pinking shears and generally have had to be followed by lapping treatments to insure proper co-action between the blades. Numerous proposals have been made to overcome the difficulties and expense of these prior methods whereby the cost of the finished product may be reduced but such proposals or prior methods have all involved some sort of expensive individual grinding, lapping or milling operation for each tooth and have failed to effect any appreciable reduction in cost as compared to that effected by the novel method described below.

Moreover, concerning one aspect of the invention, in the methods for making pinking shears heretofore suggested, no satisfactory steps for heat and quench hardening the blades have been employed because it has not been heretofore practicable to harden pinking shear blades to a high degree since heat treatments suggested in the past have caused the blades to warp into inaccurate shapes.

The invention in one aspect thereof is constituted by the following novel method for making pinking shears and by the product thereof:

(1) *Preforming of blades.*—The pinking shear blades are first preformed from a hardenable metal substantially in their final shape, for example, by casting. Other methods for such preforming can be used, such as machining or forging. If preforming of the blade is effected by casting, it is done as nearly as possible to a final blade shape which, for example, has the following characteristics found to be highly desirable: teeth are formed therein preferably extending substantially all the way across the inner faces of the blade and curved concentrically with the axis of the pivot thereof. Each tooth has a peak or a vertex line and between each pair of teeth a valley is formed at the low point of which a valley line exists. These peak and valley lines are curved concentrically with the axis of the pivot of the shears and each pair of adjacent peak and valley lines are thus equidistant from one another throughout the lengths thereof, and are situated in parallel planes which are inclined or which recede slightly relative to the so-called cutting plane of the shears, thereby forming undercut shearing surfaces. The above-mentioned cutting plane is considered to be that plane which is perpendicular to the pivot axis at a mid-point between the blades. The receding of the peak and valley lines assures that only the cutting edges of the two blades will intersect to provide a sharpening action thereof when the shears are being used. However, these cutting edges can be sharpened after the cold working step to be described below by merely grinding away the leading face of each blade, thereby exposing a new cutting edge which will be somewhat receded as compared to the previously existing cutting edge by virtue of the above-mentioned slight recession angle or inclination of the peak and valley lines of the teeth relative to said cutting plane.

In order to eliminate sharp corners of the teeth at the trailing edge of each blade, the teeth may be formed with progressively diminishing height as follows: at a point commencing at about one-third to one-half of the total length of each tooth, as measured from the cutting edge of the blade, the peak of each tooth may be tapered or flattened forming a so-called inclined "cut-off plane" embodying the flattening out of each tooth down about to the level of the adjacent valley lines. Thus the teeth give the appearance of having been cut away by a plane which apparently intersects the teeth at the rear extremities thereof at about the level of the valley lines, and the plane may become gradually steeper relative to said valley lines as the distance from the pivot of the shears increases. Said sharp corners of teeth on the back or trailing edges of the blades are thus eliminated, thereby avoiding snagging of, for example, textile materials.

(2) *Cold working.*—After each blade has been preformed, for example, by casting, it is cold worked into precise dimensions for cutting, that is, each blade is subjected to a high pressure forming and surfacing operation which comprises pressing the desired active areas of the teeth or blades between precision shaped dies which are subjected to, for example, about two to three hundred tons per square inch pressure. In the above-mentioned example of blade preforming, namely by casting, sharp teeth can be produced but due to irregular expansion and contraction of the metal certain of the teeth may become positioned somewhat out of proper location here and there, for example, the teeth progressively may be out of position up to one-sixteenth of an inch. The precision die pressing and forming, of course, rectifies such a condition and provides a cold hardening of the cutting surfaces.

(3) *Hardening by heating and quenching.*—After the above steps have been taken, the blades may be hardened to a high degree by heating and quenching. However, this is not a mandatory step in all forms of the novel method and represents only one form thereof. Heretofore it has not been the practice to quench harden pinking shear blades to a high degree because the heat necessary for such hardening has caused warping into inaccurate shapes. I have solved this problem by rigidly clamping each blade between suitable clamps which are cooled as by water, and which are shaped like the above-mentioned pressing and forming dies, with the exception that the cooling clamps permit the cutting edge portion of each blades to protrude and thus to be exposed at one side of the clamps to permit hardening. Such protruding portion of the blade is heat treated as by induction heating. The heating is thus confined to the active cutting edge portions of each blade whereas the remainder of the blade remains cool and is held against distortion. After heating, the blade is quenched, for example, in oil. Of course, if a metal is employed which can be hardened by heat alone, the quenching can be dispensed with. Drawing or tempering can be effected in well known ways if desired.

In another aspect of the invention the teeth of the blades are, in the preforming step, deliberately shaped slightly out of the final form they will assume as a result of the die pressing. That is, the teeth may deliberately be made slightly higher than their final altitude but preferably the transverse distance across the base of each tooth remains unchanged as a result of the die pressing, except where a fillet initially is formed along the valley lines as will appear more fully hereinafter. The planned or deliberate preforming of the teeth at an increased height compared to their final height causes the precision die to provide a pressing and surfacing operation largely upon the metal in the peak regions of the teeth. That is, the die squeezes the peak regions downwardly and forces some of the metal thereof, including some of the metal on the sides near the peaks, to move downwardly whereby a smearing or displacing action is obtained and any small surface irregularities or defects such as small pores, holes or the like in the slanted side surfaces of the teeth are filled up and/or smoothed over. If a fillet is provided along the valley between two adjacent teeth in the preformed blade, the peaks of the precision die reform the metal of the fillet in such a way that the rounded cross-section thereof will be reformed into a sharp V-shaped cross-section and at least a portion of the rounded or filleted valley region will be smeared over the lower portions of the sides of the adjacent teeth whereby surface irregularities in this region are also filled up and/or covered over.

Thus the peaks which are deliberately so preformed out of their final shape are die pressed into their desired final conformation and any peaks which may be offset laterally from their proper final positions are moved into such positions and simultaneously reduced to the desired final height.

In general said cold high-pressure forming or die pressing operation has the following functions: (a) reforming any dislocated teeth, that is, accurately repositioning such teeth into their proper relative positions concentric with the pivot axis; and (b) smoothing the angular surfaces of the teeth accurately, namely, smoothing the side surfaces of the ridges or corrugations formed in the inner faces of the shear blades, and particularly sharpening the cutting edges which are formed upon the cutting face or leading face of each blade. The surfaces near the cutting edges of the teeth can become cutting edges by merely sharpening or grinding away the cutting face of the blade.

The dies for the high pressure forming and surfacing operation are pressed toward one another along a line which is perpendicular to the planes of the curved peak and valley lines of the teeth and not perpendicular to the cutting plane of the blades which latter plane in the form shown is parallel to the outer faces or the so-called back plane surfaces of the blades.

Various further and more specific objects, features and advantages of the invention will clearly appear from the detailed description given below taken in connection with the accompanying drawings which form a part of the specification and illustrate, by way of example, preferred arrangements of apparatus for carrying out the invention. The invention consists of such novel methods and combinations of features and method steps as may be shown and described in connection with the equipment herein disclosed.

In the drawings:

Fig. 1 is a plan view of a pair of completed pinking shears embodying the present invention;

Fig. 2 is an enlarged, detailed view partly in section and with parts broken away of a pivot assembly of the shears shown in Fig. 1, the view being taken substantially on line 2—2 of Fig. 1;

Fig. 3 is an enlarged, detailed view partly in section of a fragment of the pivot assembly of Fig. 2, with parts broken away, illustrating a means for securing a main pivot shaft of the shears in a permanent adjustment;

Fig. 4 is a top plan view of one of the shear blades illustrating the corrugations or teeth formed in the inner face thereof and also showing a centrally disposed pivot bearing region together with a rudimentary handle portion;

Fig. 5 is a side view of the shear blade shown in Fig. 4 held in spaced relationship with a second blade thereabove also shown in side elevation and provided with complementary teeth adapted for fitting the teeth of the first mentioned shear blade;

Fig. 6 is an enlarged detailed view partly in section and with parts broken away taken along the longitudinal axis of the lower of the two blades shown in Fig. 5 and illustrating the relative locations of certain of the inner teeth of the blade, together with a pivot bearing surface;

Fig. 7 is an enlarged detailed sectional view taken along line 7—7 of Fig. 4;

Fig. 8 is a side view partly in section and with parts broken away of the pressing and forming dies employed in the present invention acting upon a shear blade;

Fig. 9 is a transverse sectional view of the pressing and forming dies shown in Fig. 8 acting upon a shear blade;

Fig. 10 is a detailed side elevation of the upper forming and surfacing die which is shown in Figs. 8 and 9;

Fig. 11 is a view of the under side of the die shown in Fig. 10;

Fig. 12 is a transverse sectional view of the die shown in Fig. 10;

Fig. 13 is a top plan view of the lower die assembly as employed in Figs. 8 and 9;

Fig. 14 is a side elevation of a central die element employed in the lower die assembly of Fig. 13;

Fig. 15 is a top plan view of the die element shown in Fig. 14;

Fig. 16 is a transverse sectional view of the die element shown in Fig. 14;

Fig. 17 is a plan view of a shear blade showing the corrugated or toothed inner face thereof formed in accordance with the present invention, said blade corresponding to the upper blade shown in Fig. 5;

Fig. 18 is a view of the under side of the blade shown in Fig. 17;

Fig. 19 is an enlarged, detailed, transverse, fragmentary sectional view of a shear blade undergoing pressure by the dies shown in Fig. 8;

Fig. 20 is a longitudinal fragmentary sectional view taken substantially along line 20—20 of Fig. 19;

Fig. 21 is also a longitudinal fragmentary enlarged detailed view taken substantially along line 21—21 of Fig. 19;

Fig. 22 is an enlarged view of a portion of the cutting face of a toothed blade made in accordance with one form of the present invention, illustrating reformation of teeth longitudinally of the blade or laterally of the teeth;

Fig. 23 is an enlarged view of a portion of the cutting face of a toothed blade made in accordance with another form of the invention, illustrating downward reformation of the peak regions of the teeth;

Fig. 24 is an end view of a blade hardening unit including a blade clamp and a heating device;

Fig. 25 is a side elevation of the unit shown in Fig. 24; and

Fig. 26 is a plan view of the unit shown in Fig. 24.

Referring to the drawings in further detail, the novel pinking shears are constituted, as shown in Fig. 1, by a pair of shear blades 30 and 31 each of which includes a corrugated or toothed portion extending from the tip thereof down to a point near a pivot indicated generally as at 32, there being secured to each of the shear blades conventional handle portions as at 33 and 34, respectively. The corrugations or serrations are indicated with respect to blade 30 of Fig. 1 generally at 35, the corrugations extending substantially over the entire inner face of such blade, there being corresponding corrugations or serrations formed on the inner face of the blade 31 and positioned in such a manner that the teeth or ridges of the latter fit into the furrows or valleys of the other blade.

As shown in Fig. 1 and in detail in Figs. 4 and 7, the peaks of the serrations do not extend all the way across the inner face of the blade 30 but rather each peak is flattened out commencing along a line as indicated at 36 (Figs. 4 and 7) whereby each tooth is formed as if cut away by a plane intersecting same commencing at the line 36, which plane also intersects the bottoms of the valleys on either side of the teeth at the rear or trailing edge of the shear blade. Thus each serration is formed as if a so-called cut-off plane has been passed therethrough as indicated in Fig. 7 regarding tooth 30a.

As above mentioned, the reason for so forming the serrations on each of the blades is to eliminate sharp edges at the rear of each blade and also to provide for greater clearance between the overlapping portions of the shear blades as they are progressively closed, whereby the desired pressure will occur at the place where the cutting takes place.

Each of the blades 30 and 31 is slightly tapered from the central hub or pivot portion towards the tip, for example, as shown in Fig. 4, wherein both the leading and trailing edges of the blade converge, each in a slightly arcuate path.

Each tooth has a vertex or peak line as at 37 (Fig. 7) extending between the line 36 and a line 38 along the peaks of the teeth at the cutting face. Also each tooth has a valley line as indicated at 39 extending between the leading or cutting face of the blade and the trailing face thereof. The arcuate peak and the valley lines are situated in parallel planes and are concentric, and hence equidistant from one another. Such planes, as shown in Fig. 7, are inclined at a slight angle, for example, 1°, relative to the cutting plane of the shears which, as in this figure, is horizontal. The angular disposition of the plane of said peak and valley lines relative to a horizontal plane, as shown in Fig. 7, is referred to as an angle of recession or angle of undercut, which angle insures that only the cutting edges of the two blades will intersect and will provide a sharpening action therebetween by virtue of their repeated engagement. Moreover, these cutting edges can be sharpened by simply grinding away a portion of the surface of the leading or cutting face of each blade, thereby exposing an inner cross-section of the serrations which will be somewhat receded from the previously existing cutting edge because of the above-mentioned recession angle.

It will be seen in Fig. 7 that the back plane surface of the blade 30 as at 30b is substantially parallel to the cutting plane.

Also, as shown in Fig. 7, the angle between the so-called cut-off plane for tooth 30a and the valley line 39 is 12°. This angle becomes progressively larger as the tip of the blade is approached.

The teeth 35 are all concentric with the axis of the pivot as at 40 (Fig. 4).

Novel means are employed for associating the two blades in such a manner that the concentric teeth are held constantly in proper relationship despite a grinding away of the cutting edges of the blades by repeated sharpening. The novel means are constituted by a so-called hemispherical pivot bearing structure which permits a preselected amount of angular movement of one blade relative to the other about a hemispherical surface as the blades progressively close or open, such movement being within predetermined minute limits. Resilient means are provided for urging a hemispherical bearing seat formed in one of the blades against the main hemispherical pivot surface. The means for accomplishing this are illustrated in detail in Figs. 2 and 3. When one of the blades, for example, blade 30, is initially formed as by casting, as will appear more fully hereinafter, a hemispherical bearing surface 41 is formed at the pivot portion thereof (Figs. 2, 4 and 6). This hemispherical bearing surface is adapted for co-action with a pivot bearing button 42 which constitutes the above-mentioned hemispherical main bearing surface. The pivot bearing button 42 is provided with a central bore through which passes a main pivot shaft or bolt 43 having a head 43a at one extremity and threads 43b at the opposite extremity.

In order to provide a permanently lubricated bearing for the shears, bearing button 42 and a pivot washer to be described below are preferably formed of compressed powdered iron or steel mixed with graphite and/or oil.

The head 43a is adapted for engagement with a resilient member which, in the form shown, is termed a pivot cup washer 44 having a central cup portion 44a adapted to receive the head 43a, the lowest surfaces of the central cup portion 44a, as viewed in Fig. 2, being held away from the hub of the blade 30 by means of resilient outwardly flared or bell portions 44b of the element 44. The pivot shaft or bolt 43, of course, passes through a suitable bore 45 in the blade 30 which is slightly greater in diameter than the diameter of said bolt 43, whereby said minute angular movement of the blade 30 about the hemispherical button 42 can take place.

The threaded extremity of the pivot shaft 43 is in engagement with a suitable threaded member referred to as a pivot bearing nut 46 and may be provided with a scalloped edge to facilitate tightening thereof upon said bolt 43.

The blade 31 is provided with a bore or recess as at 47 which is adapted for receiving a cylindrical portion 42a of the pivot bearing button 42 and for holding same snugly therein. Pivot bearing button 42 thus is held in fixed relation to the hub of blade 31 and does not shift axially when in use although it possibly may shift angularly about the pivot axis of the shears. Said bore 47 is of adequate diameter to receive a cylindrical portion 46a of the pivot bearing nut 46.

For purposes of lubrication and ease of operation of the pinking shears, there is interposed between the pivot bearing nut 46 and the blade 31 a so-called pivot washer 48 which preferably is received in an annular recess 47a which is concentric with the bore 47 and formed in the blade 31 adjacent an outer extremity of said bore. The annular recess 47a preferably receives the pivot washer 48 in such a manner that it is flush with outer hub surface 31a of the blade 31.

In order to reduce friction, the inner cylindrical portion 46a of said nut 46 is of a diameter sufficiently less than that of the bore 47 to prevent contact therebetween. An inner shoulder portion 46b of the nut 46 is of such a diameter that it fits snugly within the pivot washer 48, thereby holding the nut 46 in concentric relationship with the axis of the bore 47.

In order to facilitate the tightening of the pivot bearing nut 46 upon the bolt 43, whereby the blades of the shears are resiliently urged together, and the hemispherical surfaces 41 and 43 are also urged together, a locking key or spline 43c is provided in the bolt 43 and adapted for engaging a longitudinally extending groove 45a formed in the bore 45 (Figs. 2 and 4).

By virtue of the cooperation of the spline 43c and the groove 45a, it will be seen that the blades can be urged together by turning only the pivot bearing nut 46, whereby the pivot cup washer will be urged centrally inwardly and thereby placed under compression.

When a desired compression has been imposed upon the pivot cup washer 44 by tightening nut 46, the position of the bolt 43 relative to said nut 46 is set or fixed by bulging outwardly an outer threaded extremity 43d of the bolt 43 as by a tapered spreading tool 49 (Fig. 3) which forces said threaded portion 43d radially outwardly into a conical chamber 46c formed concentric with the threaded bore of the nut 46. A suitable passage 46d is provided in the nut 46 for the insertion of the tool 49. Thus a desired adjustment of the pivot can be made permanent and will not be subject to maladjustment due to repeated opening and closing of the blades.

If desired a spacer in the form of a washer 50 can be interposed between inner hub surfaces 51 and 52 in order to assist in adjusting the relative positions of such surfaces to provide maximum cutting efficiency and ease of operation.

The novel shears above described are made by a novel method as follows: The shear blades 30, 31, as shown in Fig. 5, are first preformed substantially in their final shape as by casting. If casting is employed, the blades are formed as accurately as possible, for example, as shown in detail in Figs. 4 and 5. The general conformation of the blades has been described above in detail, particularly in connection with Fig. 7. If desired, the handle portions 33 and 34 can be formed integrally and of the same material as the blades 31 and 30. As an alternative, rudimentary handle portions 54 and 55 (Figs. 4, 5, 17 and 18) may be cast integral therewith for supporting respective handle skeleton members of metal about which may be formed a covering, for example, of rubber or plastic in a well known manner and in the shapes indicated in Fig. 1. The formation of the handle portions 33 and 34 of rubber or plastic preferably takes place after the cold working and hardening operations to be described below.

After the blades have been preformed they are subject to cold working by precision dies under high pressure, whereby the desired active areas of the teeth are pressed between dies shaped to a high degree of precision and subjected to a pressure of, for example, two to three hundred tons per square inch. The cold working will produce a blade of adequate hardness but it is desirable to harden further by heating and quenching as will appear hereinafter. The casting operation will produce sharp blades but, as above mentioned, due to irregular expansion and contraction, the teeth may be somewhat out of proper position here and there, for example, the teeth farthest from the pivot may be as much as one-sixteenth of an inch removed from their proper position as shown in Fig. 22 wherein the teeth shown in broken lines represent their position before cold forming and the teeth in solid lines such position after cold forming. The high pressure cold forming and surfacing operation (a) reforms and repositions any of the teeth, which may have moved from their proper location, accurately and concentrically relative to the axis of the pivot; and (b) smooths the surfaces of the teeth, particularly the cutting edges into precise dimensions for easy cooperation during cutting. The surfaces near the cutting edge, namely, near the leading srrrated face of a blade, can be made into such an edge by repeated sharpening as by grinding away such leading face. Suitable cold forming dies, for example, for blade 31, are shown in Figs. 8–16 and 19–21, inclusive, the upper die being indicated generally as at 56 and the lower die as at 57. The serrated surfaces of the die 56 are, of course, complementary to the desired serrated surfaces of a finished blade as 31. That is, the die surfaces are accurately formed in a shape to produce the desired final form of said blade 31. The dies 56 and 57 when pressed together, form and surface not only the corrugations or serrations of the blade but also may assist in flattening in desired parallel planes the inner and outer hub surfaces of such blade surrounding the hub bore 47. The inner surfaces are indicated in Fig. 2 as at 51 and the outer hub surfaces as at 31a.

It will be understood, of course, that analogous dies are employed for forming and surfacing the other blade 30.

The dies 56 and 57 are mounted between the jaws of a suitable press, such jaws being respectively indicated at 58 and 59.

In the form shown, the lower die 57 is constituted by three main elements, namely: (a) the base member 60 (Figs. 8, 9, 14 and 15) which absorbs the major portion of the thrust of the press; (b) a surrounding side support or guide element 61 having a substantially centrally disposed passageway 61a in which the base member 60 is vertically movable; and (c) a blade aligning element 62. In the upper surface of the die guide element 61, a suitable blade recess 61b is formed for the reception of the blade aligning die element 62 which is adapted for holding the blade 31 in proper longitudinal alignment upon the base die member 60.

After a blade, such as blade 31, has been pressed between the dies 56, 57, it is, of course, necessary to remove the pressed blade. A suitable so-called blade knockout device is provided for this purpose. The die base member 60 is movable in the passageway 61a between a bed plate 63 and the upper surfaces 61c of a slot 61d formed in the bottom of the die support element 61. The allowable movement of said base member 60 within the above limits is adequate to eject a pressed blade from the die 57. A blade knockout shaft 63a (Fig. 9) is longitudinally movable in a suitable bore beneath said member 60 and can be urged by suitable means upwardly to lift the base die member 60 and thus to eject the blade.

As indicated in Fig. 16, the upper surface 60a of the base die member 60 is not horizontal, that is, it is not perpendicular to the direction of motion of the die 56 but is tilted at an angle corresponding to the above-described recession or undercut angle of the teeth of the blade 31. The recession angle is indicated in Fig. 7 as 1°, with respect to blade 30. A corresponding recession angle is formed in the blade 31. Consequently said surface 60a is inclined at an angle of 1° in such a manner that when the blade 31 is placed thereon the peak and valley lines of the teeth thereof will be in a horizontal plane and thus will be perpendicular to the direction of motion of the dies 56 and 57.

Thus the high pressure dies move together along a line which is perpendicular to the plane in which the arcuate peak and valley lines of the teeth are located and not perpendicular to the cutting plane of the blade or to the back plane surface thereof.

If desired, in order to avoid the necessity for a press of extremely high pressure, the dies 56 and 57 may be formed in such a manner that a uniform pressure is applied to the toothed or serrated portions of the blade over only a portion thereof and preferably over the area commencing at the leading or cutting edge thereof back to, for example, line 36a (Fig. 11), which is analogous to line 36 of Fig. 4 and marks the point where the cut-off plane for each tooth commences. If desired, the dies thus can be designed to give uniform rigid support only over said area from the cutting edge to line 36a whereupon the dies may be designed to allow the metal to yield so that the high pressure surfacing gradually diminishes to insignificance as the back or trailing extremity of each tooth is approached.

As above mentioned, in one modification of the invention each blade is preformed with the teeth thereof deliberately higher than their final altitude after cold forming. For example, the difference in tooth height may be one-sixth. This is done in order that the die 56 will accomplish a downward reformation of the peak regions of the teeth to give a smearing action along the sides of the teeth whereby surface defects are covered, and also in order to assist in the formation of the teeth to a high degree of precision. As shown in Fig. 23 in broken lines, the teeth of a blade so preformed are compared in cross-section to the teeth in their final form. It will be seen that the metal at the peak regions of these teeth, as initially formed, is smeared downwardly over the sides thereof by virtue of the extremely high pressures applied by the dies.

A somewhat analogous smearing action can be accomplished in the valley regions between the teeth if the valleys are filleted along the floors thereof, as indicated in cross-section as at 35a in Fig. 23. Of course, the peaks of the serrations of the die 56 will engage such a fillet 35a and force the metal thereof upwardly along the sides of the two adjacent teeth, whereby surface defects in the valley regions may be smoothed and/or covered by the smearing action of the metal.

Thereafter, in accordance with one aspect of the invention, each blade or its cutting edge region may be hardened to a high degree by a heating and quenching which is conducted in such a manner and with such apparatus that the blade and teeth are prevented from warping into inaccurate shapes. This is accomplished by rigidly clamping the main body portion of each blade between clamps which are cooled as by water and which are shaped somewhat like the above-mentioned forming and surfacing dies with the exception that they are formed to permit the region along the cutting edge of the blade to be exposed at one side of the clamps. The exposed cutting edge region is heat treated, for example, by induction heating, the heating being confined substantially to the active blade edges or to said protruding portions, whereas the remainder of the blade remains relatively cool and is held against distortion. The holding of portions of the teeth and the main body portion of the blade against distortion by such clamps is effective to prevent distortion of the teeth of the cutting edge regions which might otherwise occur due to the hardening treatment. Suitable clamps for this purpose are indicated in Figs. 24, 25 and 26 which may be pressed or clamped together by any suitable means.

The clamp above mentioned is constituted in general by a quench block 64 which is adapted for receiving in a slot 64a in the upper surface thereof a pair of precision-formed clamp members 65 and 66, the latter of which is provided with serrations for grasping and holding in position, in combination with member 65, the teeth of the blade to be hardened excepting relatively small protruding portions.

The main body of the blade is held between members 65 and 66 and the cutting edge region thereof protrudes there-above between longitudinally extending inductor bars 67a and 67b of a high frequency inductor 67 connected to a suitable source of electric energy (not shown). The high frequency inductor is secured at the extremities thereof to suitable electric conductors 68, 69. Upon the latter conductors there is preferably mounted an inductor support block 70 (Fig. 25) which may be of any suitable insulating material and which is adapted for supporting at the outer extremity thereof the outer extremity of the inductor 67, for example, by means of an arm 71. The outer portion of the high frequency inductor 67 is preferably U-shaped, as at 67c (Fig. 24), in order to facilitate the insertion of the blade cutting region between the inductor bars 67a, 67b.

The quench block is provided with suitable passageways therein for a cooling fluid such as water which may enter the block, for example, through an inlet conduit 72 in the righthand portion thereof, as viewed in Fig. 24, there being an exit conduit as at 73 for such coolant. Analogous inlet and outlet conduits are provided in the lefthand portion of the quench block (Fig. 24) at 74 and 75.

The cutting edge region is rapidly heated to a temperature of between about 1800° and 1850° F. by means of the high frequency inductor and are thereupon quenched in water, oil or air, depending upon the type of steel employed.

After the hardening step, which provides a glass-hard finish, the cutting region of the blade may, if desired, then be drawn or tempered by reheating same up to about 700° F., whereupon it is again quenched.

By means of the above clamping device, the blades are held in accurate shape so that they may be hardened to a degree customary for the highest grade of steel.

Any suitable hardenable ferrous or non-ferrous metal can be used for making the novel shears described herein, for example:

(1) Ferrous metals:
    (a) Stainless steel
    (b) Tool steel
(2) Non-ferrous metals:
    (a) Silicon bronze
    (b) Beryllium copper The following steels have been found suitable:

(1) Stainless steel (cutlery grade)—
    12/14% Cr
    .30/.50% C
    Balance—substantially iron
(2) Stainless steel (cutlery grade)—
    17/19% Cr
    .70/.90% C
    Balance—substantially iron
(3) Tool steel—
    .60/.80% C
    0.30% (max.) Mn
    0.25% (max) Si
    Balance—substantially iron After each blade has been made, it is desirable to form an initial sharp cutting edge thereon by a suitable slight grinding of its leading edge or cutting face. The shears can be later sharpened simply by repeated grinding away of such cutting edges, whereby new and slightly receded cutting faces will be formed as above explained. However, despite repeated grinding away of said cutting faces or sharpening by any other means, the reshaped and resurfaced and compacted surfaces of the teeth will remain concentric to the common pivot and hence will remain in proper relationship to one another.

This novel method for manufacturing pinking shears as compared with prior methods, which latter have of necessity included machining of the individual teeth, lapping against a master blade or other expensive metal removal operations peculiar to each tooth, is expected to reduce the cost of the product by about fifty to sixty percent.

In order to facilitate the cold forming by means, for example, of a die, the metal blades after preforming can be softened as by annealing prior to cold forming.

While the invention has been described with respect to certain preferred examples which have given satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and is desired to be secured by Letters Patent is:

1. The method for manufacturing a pinking shear blade having a leading face wherein a cutting edge is located which consists in: preforming the blade of a hardenable metal substantially in its final shape with a plurality of concentric arcuate pinking teeth therein of progressively increasing radii relative to the pivot axis of the blade; cold working the blade into accurate cutting dimensions by subjecting same to high pressure between precision-shaped dies whereby the teeth are moved into correct relative position and are worked into accurate dimensions for cutting, said cold working effecting a cold hardening of the cutting surfaces of the blade; and thereafter sharpening the blade by grinding the leading face thereof.

2. The method for manufacturing a pinking shear blade having a leading face in which is located a cutting edge which method consists in: preforming the blade of a hardenable metal substantially in its final shape with a plurality of concentric arcuate pinking teeth therein of progressively increasing radii relative to a pivot axis of the blade, said metal being hardenable by cold working, said teeth being preformed at a height slightly in excess of a final preselected height; cold working said blade with a precision die under high pressure, the altitude of the teeth of said die being lower than that of said preformed teeth and comprising the final desired altitude of the teeth of the blade, such cold working under high pressure effecting a reformation of the peak regions of the teeth of the blade whereby the metal of such peak regions is displaced downwardly and the teeth are smoothed into precise dimensions for cutting; and thereafter sharpening the cutting edge of the blade by grinding the leading face thereof.

3. The method for manufacturing a pinking shear blade having a main body portion and a cutting edge region which consists in: preforming the blade of a hardenable metal substantially in its final shape with a plurality of concentric arcuate pinking teeth therein of progressively increasing radii relative to a pivot axis of the blade; cold working the blade by subjecting same to high pressure with a precision die, whereby the teeth are worked into precise dimensions for cutting, such cold working effecting a reformation of the peak regions of the teeth of the blade whereby the metal of such peak regions is displaced downwardly and the teeth are smoothed into precise dimensions for cutting; thereafter rigidly clamping at least the main body portion of the blade between cooling clamps of a shape complementary to the surface pressed therebetween, the cutting edge region of the blade being exposed and protruding from between the clamps; applying heat to the cutting edge region to raise same to a hardening temperature; and thereafter quenching the blade.

4. The method for manufacturing a pinking shear blade having a main body portion and a cutting edge region which consists in: preforming the blade of a hardenable stainless steel substantially in its final shape with a plurality of concentric arcuate pinking teeth therein of progressively increasing radii relative to a pivot axis of the blade; cold working the blade into its precise final dimensions by subjecting same to a precision die under high pressure whereby the teeth are worked into accurate dimensions for cutting; thereafter rigidly clamping the main body portion of the blade between metal clamps of a shape complementary to the surface pressed therebetween, the cutting edge region of the blade being exposed and protruding from between the clamps; applying heat to the cutting edge region to raise same to a temperature between about 1800–1850° F.; and thereafter quenching the blade.

5. The method for manufacturing pinking shears which consists in: preforming each blade substantially in its final shape with a serrated surface, the serrations forming concentric arcuate teeth of progressively increasing radii relative to a pivot axis, the leading face of each blade forming a cutting edge region, the arcuate concentric teeth having peak and valley lines situated in parallel planes, which planes recede relative to a cutting plane of the shears; cold forming the teeth into precise dimensions by applying higher pressure to each blade between precision shaped dies, one of which is provided with concentric arcuate teeth of accurate conformation complementary to the blade teeth, the altitude of the teeth of the last-mentioned die being less than the altitude of the teeth which have been preformed upon such blade, such altitude upon the die comprising the final desired altitude of the teeth of the blade, whereby the teeth of the blade are forced into desired relative positions and the surfaces thereof are smoothed.

6. The method for manufacturing a pinking shear blade having a main body portion and a cutting edge region which consists in: preforming the blade of hardenable metal substantially in its final shape with a plurality of concentric arcuate pinking teeth therein of progressively increasing radii relative to a pivot axis of the blade; cold working the blade by subjecting same to a precision die under high pressure, whereby the teeth are worked into precise dimensions for cutting; thereafter rigidly clamping at least the main body portion of the blade between cooled clamps of a shape corresponding to the surface pressed therebetween, the cutting edge region of the blade being exposed and protruding from between the clamps; and thereafter hardening the protruding cutting edge region of the blade by the application of heat localized to such region while simultaneously cooling the clamps whereby the blade portions held therein remain relatively cool, and then quenching the blade.

7. The method for manufacturing a pinking shear blade which consists in: preforming the blade of a hardenable metal substantially in its final shape with a plurality of concentric arcuate pinking teeth therein; the teeth being preformed at an altitude slightly in excess of a final preselected altitude and having fillets in the valley regions between adjacent teeth; cold working the blade by means of a precision die under high pressure, said die having teeth of a shape complementary to that finally desired and of an altitude slightly less than that of the preformed teeth whereby the toothed die under pressure effects a reforming of the metal in the peak regions and filleted valleys of the teeth, the metal in the peak regions being smeared downwardly toward the bases of the teeth and the metal in the filleted valley regions being smeared upwardly toward the peaks of the teeth adjacent to each valley; thereafter clamping a portion of the blade between cooled clamps of a shape complementary to said portion of the blade pressed therebetween, a cutting edge region of the blade being exposed and protruding from between the cooled clamps; applying heat to the cutting edge region of the blade to raise same to a preselected temperature; and thereafter quenching the blade to harden same.

8. The method for manufacturing a pinking shear blade which consists in: preforming a blade in substantially its final shape with a plurality of arcuate pinking teeth in one surface thereof which are concentric and are of progressively increasing radii from a common pivot axis; cold forming said blade by subjecting same to a precision-shaped die under high pressure, said die having arcuate teeth formed therein which are complementary in shape to the final conformation of the teeth in the blade, the altitude of the teeth preformed in the blade being slightly in excess of the altitude of the teeth formed in the precision-shaped die, the pressing of the toothed blade by the die effecting a reformation of the peak regions of the teeth of the blade to provide a smearing action of the metal in such regions along the sides of the teeth whereby the teeth are pressed into accurate dimensions and surface defects therein are covered over; rigidly clamping a portion of the die pressed blade between clamps having surfaces corresponding respectively to the toothed blade surface and to the opposite blade surface thereof, a cutting edge region of the blade being exposed longitudinally along the blade and projecting from between the clamps; and thereafter hardening such cutting edge region by the application of heat and by quenching.

9. The method for manufacturing a pinking shear blade having a main body portion and a cutting edge region which consists in: preforming the blade of a hardenable metal substantially in its final shape with a plurality of concentric arcuate pinking teeth which are formed having a height slightly greater than the final height thereof, said arcuate pinking teeth being of progressively increasing radii relative to a pivot axis of the blade; subjecting said toothed blade to high pressure with a precision die having teeth of slightly less height than the teeth preformed in said blade, the base of the teeth of the die in transverse cross-section being substantially equal to an analogous base tooth dimension of the preformed blade teeth, the application of pressure by means of the precision die being effective to work the teeth of the preformed blade into precise dimensions and also being effective to make a downward reformation of the metal in the peak regions of said blade teeth whereby a smearing action of such metal is effected for assisting in accurately smoothing the surfaces of said arcuate teeth, and the latter are worked into precise dimensions for cutting; thereafter rigidly clamping the main body portion of the blade between clamps of precise shape complementary to the surface pressed therebetween, the cutting edge region of the blade being exposed and protruding from between such clamps; applying heat to the protruding cutting edge region to raise same to a preselected temperature; and thereafter quenching the blade.

10. The method for manufacturing pinking shears, which consists in: preforming substantially in its final shape a pair of blades whereby each blade is provided with a plurality of concentric arcuate corrugations in one surface thereof comprising in cross-section serrations forming pinking teeth, which corrugations are of progressively increasing radii with respect to a pivot axis of said blades, said teeth being positioned for shearing cooperation in response to an angular shifting of the blades about the pivot axis; cold forming said blades by subjecting each to high pressure between dies of preselected accurate conformation, whereby the teeth of the blades are forced into preselected positions relative to each other and are pressed to precise dimensions for cutting, said cold forming also being effective to smooth the side surfaces of the teeth; hardening each blade by clamping the main body portion thereof in a quench block having portions which conform to the outer surfaces of at least the main body portion of each blade, the cutting edge portion of each blade being exposed and projecting from the quench block, the latter being effective to maintain the clamped teeth of each blade in accurate preselected position during hardening thereof; and heating the cutting edge portion of each blade while simultaneously cooling the quench block, and thereafter quenching the blade.

11. The method for manufacturing pinking shears which consists in: preforming substantially in final shape a pair of cutting blades with interfitting undercut pinking teeth of arcuate conformation and concentric with a pivotal axis for said blade, reshaping and resurfacing the teeth of the blades by high pressure between dies of preselected accurate conformation, thereafter clamping portions of the blades between clamps, one of which is provided with teeth for holding the blade teeth in proper position, there being portions of each blade protruding from the side of the clamps, the protruding portion comprising the cutting edge regions of the blades, and thereafter hardening said cutting edge regions by heating while cooling said clamps, and thereafter quenching the heated portions of the blades.

12. The method for manufacturing pinking shears having a pair of blades which consists in: preforming the blades with complementary serrated surfaces substantially in final form, the serrations of each blade forming arcuate teeth having peak and valley lines of progressively increasing radii concentric with a pivot for the shears, the serrations at a leading face of each blade forming a cutting edge portion, the teeth of one leading face on one blade being adapted for progressive complementary engagement with the teeth on the leading face of the other blade, the peak and valley lines of the teeth being situated in parallel planes which recede relative to a cutting plane of the shears; applying a blade forming pressure to each serrated blade surface in a direction perpendicular to the planes of the peak and valley lines of the teeth by means of dies having complementary serrated surfaces of preselected accurate conformation whereby the teeth preformed in the blade are forced into desired precise relative positions and dimensions and the surfaces thereof are smoothed; thereafter clamping a portion of each blade in a cooled clamp, the portion of the clamp for engaging the serrated surface of the blade being of a desired complementary accurate conformation having arcuate teeth corresponding in shape to that of said serrated die, an active cutting edge region of the blade protruding from the clamp; applying heat to such protruding region of each blade while simultaneously cooling the clamps whereby the blade portions held by the clamp remain relatively cool; and thereafter grinding away a portion of the leading face of each blade.

13. The method for manufacturing pinking shears including a pair of blades which consists in: casting each blade with a serrated surface, the serrations extending over a substantial portion of the blade width and forming arcuate teeth therein of progressively increasing radii relative to and concentric with a pivot axis for the blades, the serrations at the leading faces thereof forming a cutting edge portion, the lines running along the peaks and in the lowermost portions of the valleys of said serrations being situated in parallel planes which recede relative to a cutting plane of the shears; applying pressure to each blade between dies, the serrated surface of each blade having a respective die provided with complementary arcuate teeth therein of preselected accurate conformation for forcing the teeth cast in the blade into desired relative positions and for smoothing the surfaces of the teeth; thereafter clamping a portion of each blade in cooled clamps having serrations complementary to portions of the arcuate teeth of the blade; the cutting edge portion of each blade protruding from the clamps, hardening the active cutting edge portion of each blade by the application of heat and by quenching; and thereupon grinding the leading faces of the serrations forming the cutting edge portion of each blade.

14. The method for manufacturing pinking shears which consists in: preforming each blade substantially in its final shape with a corrugated surface portion comprising an inner blade face, the corrugations forming arcuate teeth concentric to and of progressively increasing radii relative to a pivot axis, the teeth having arcuate peak and valley lines situated in parallel planes which recede relative to a cutting plane of the shears; cold forming the teeth of each blade to precision dimension by pressing same between dies, one of which is provided with corrugations of preselected accurate conformation for forcing the blade teeth into a precise desired relative position and for smoothing the surfaces of the teeth whereby a leading face of each blade is formed into a cutting edge; hardening the region of each blade near the cutting edge by heating and quenching; and thereafter sharpening each cutting edge by grinding.

15. The method for manufacturing pinking shears which consists in: preforming a pair of blades each with a plurality of grooves in one surface thereof comprising in cross-section serrations having angular surfaces disposed forming arcuate pinking teeth of progressively increasing radii from a pivot axis of said blades, said teeth being positioned for shearing cooperation in response to an angular shifting of the blades about the pivot axis, such pinking teeth being preformed substantially in their final shape; cold forming said blades by subjecting each to high pressure between pressing and forming dies of preselected accurate conformation whereby the teeth of the blades are forced into preselected positions relative to each other and to the pivot axis, said pressing and forming dies also smoothing the angularly disposed surfaces of the teeth; rigidly clamping each blade between cooling clamps of a shape corresponding respectively to the toothed surface and to the opposite surface thereto, the cutting edge region of the blade being exposed and projecting from between the clamps; and hardening the cutting edge portion of each blade by the application of heat while simultaneously cooling the clamps whereby the blade portions between the clamps remain relatively cool, and thereafter quenching.

16. A pair of shears comprising, a pair of members each being constituted by a blade portion, a handle portion and a pivot portion intermediate the handle and blade portions, said blade portions having inner faces having formed thereon a plurality of arcuate teeth having leading and trailing regions, the teeth being concentric with the axis of the pivot of the shears, said arcuate teeth forming upon the leading edge of each blade portion complementary interfitting pinking serrations, a pivot member extending through said blade members at the pivot portion thereof for holding same in angularly shiftable relationship, a resilient member associated with at least one of said blade members and said pivot member for resiliently urging the blade members together, one of said blade members being provided with a hemispherical bearing surface for surrounding said pivot member, a hemispherical pivot bearing member mounted upon the other of said blade members and adapted for engaging the hemispherical bearing surface first mentioned, said resilient member being effective to urge together the toothed portions of the blade members when undergoing angular movement about said hemispherical bearing member whereby the concentric arcuate teeth of the blade members are constantly maintained in concentric relationship to said pivot member despite grinding away of the cutting edges of the blade members.

17. Pinking shears comprising a pair of cast substantially flat blades each having upon the inner face thereof a plurality of alternate arcuate ridges and grooves comprising teeth which are concentric to a common pivot axis for said blades, said ridges and grooves upon the leading faces of the blades forming interfitting pinking teeth positioned for shearing cooperation in response to angular closing of the blades about the common pivot axis thereof, said teeth having peak and valley lines which are situated in parallel planes and which recede angularly relative to the cutting plane of the shears, a hemispherical bearing surface formed in one of the blades at a pivot portion thereof, a hemispherical bearing element held by the other of the blades and adapted for fitting into the hemispherical bearing surface and for holding the blades at the pivot portions thereof in spaced relation, and resilient means for urging the blades together at the pivot portions thereof.

18. Shears comprising a pair of cutting blades, a hinge pin for pivotally connecting said cutting blades, said blades including cutting members disposed on one side of said hinge pin and gripping means on the other side of said pin, the inner faces of the cutting members having interfitting pinking teeth curved concentrically with respect to the axis of said hinge pin, resilient means for urging said blades together at the hnge pin, one of said blades being formed with a hollow hemispherical bearing surface surrounding said hinge pin and opening upon the inner surface of said blade, a hemispherical bearing element fixed upon the other blade and adapted for surrounding said hinge pin and engaging the hollow hemispherical bearing surface, said hemispherical bearing element being of compressed powdered metal and a lubricant, a pivot bearing nut associated with said hinge pin for holding said blades together, and a pivot bearing washer interposed between said pivot bearing nut and one of said blades, said washer also being constituted by compressed powdered metal and a lubricant.

19. Scissors comprising a pair of cutting blades, a pivot member passing through said blades at a pivot portion thereof for interconnecting same for angular movement, said blades having inner faces extending along one side of said pivot member and being provided with interfitting compacted pinking teeth which are arcuate and formed concentrically with the axis of said pivot member, said pivot member including head elements formed at either extremity thereof, a resilient member associated with one of said head members for urging the blades together, one of said blades having formed therein a hollow hemispherical bearing surface surrounding said pivot member, a hemispherical bearing element mounted in the other of said blades adapted for fitting into the hollow hemispherical bearing surface of the other blade and having therein a passage through which extends said pivot member, and a pivot bearing washer member interposed between said last-mentioned blade and the other head element of said pivot member, said hemispherical bearing element and pivot bearing washer being formed with compressed powdered steel impregnated with a lubricant.

20. In a joint for scissors, the latter comprising a pair of cutting blades pivotally connected by the joint, said blades including cutting members disposed on one side of the joint and gripping members on the other side, the inner faces of the cutting members having interfitting undercut pinking teeth formed arcuately and concentrically with respect to the pivot axis of the joint, the combination with said blades comprising: a joint pivot member having head elements at both extremities thereof, a hemispherical bearing element mounted upon a first of said blades and adapted for engaging a hollow hemispherical bearing surface formed in the other of said blades, said hemispherical bearing element surrounding said pivot member and being composed of compressed powdered metal and a lubricant, a pivot bearing washer interposed between one of said head elements and said first blade, said washer also being composed of compressed powdered metal and a lubricant, and resilient means asssociated with said pivot member and at least one of the blades for urging the latter together.

21. Pinking shears comprising a pair of members each being constituted by a blade portion, a handle portion and a pivot portion intermediate the handle and blade portions, said blade portions having inner faces having formed thereon a plurality of arcuate teeth having leading and trailing regions, the teeth being concentric with the axis of the pivot of the shears, said arcuate teeth forming upon the leading edge of each blade portion complementary interfitting pinking serrations, the latter being defined by alternate arcuate ridges and grooves appearing in cross section, such ridges and grooves upon the leading faces of the blades, said interfitting serrations positioned for shearing cooperation in response to angular closing of the blades about the common pivot axis thereof, said teeth having peak and valley lines which are situated in parallel planes and which recede angularly relative to the cutting plane of the shears, each of said arcuate teeth having the trailing region thereof flattened to form a substantial plane surface thereupon which recedes from the cutting plane at a substantially greater angle as compared to the angle of recession of said peak and valley lines, such trailing region plane surface extending substantially to the farthermost extremity of the tooth to a line substantially in the plane formed by the two valley lines adjacent such tooth.

References Cited in the file of this patent
UNITED STATES PATENTS

| Number | Name | Date |
|---|---|---|
| 18,327 | Darling | Oct. 6, 1857 |
| 489,406 | Austin | Jan. 3, 1893 |
| 1,285,852 | Watrous | Nov. 26, 1918 |
| 1,351,440 | Pittman | Aug. 31, 1920 |
| 1,586,026 | Caldwell | May 25, 1926 |
| 1,886,273 | Thomson | Nov. 1, 1932 |
| 2,132,373 | Bartholemew | Oct. 4, 1938 |
| 2,204,071 | Dalley | June 11, 1940 |
| 2,268,626 | Sigoda | Jan. 6, 1942 |
| 2,284,664 | Kissling | June 2, 1942 |
| 2,350,667 | Bates | June 6, 1944 |
| 2,363,736 | Lynn | Nov. 28, 1944 |
| 2,387,053 | Brown | Oct. 16, 1945 |
| 2,431,517 | Stevens | Nov. 25, 1947 |
| 2,452,993 | Calloway | Nov. 2, 1948 |
| 2,467,302 | Forster et al. | Apr. 12, 1949 |
| 2,492,121 | Soderberg | Dec. 20, 1949 |
| 2,512,688 | Skog | June 27, 1950 |
| 2,565,552 | Ern | Aug. 28, 1951 |
| 2,579,521 | Sorensen | Dec. 25, 1951 |
| 2,590,024 | Lieberman | Mar. 18, 1952 |